C. W. SPICER.
FLEXIBLE COUPLING.
APPLICATION FILED JAN. 5, 1921.

1,416,134.

Patented May 16, 1922.

Inventor
Clarence W. Spicer
By his Attorneys
Sheffield & Betts

UNITED STATES PATENT OFFICE.

CLARENCE W. SPICER, OF PLAINFIELD, NEW JERSEY, ASSIGNOR TO SPICER MFG. CORPORATION, OF SOUTH PLAINFIELD, NEW JERSEY, A CORPORATION OF VIRGINIA.

FLEXIBLE COUPLING.

1,416,134.  Specification of Letters Patent.  Patented May 16, 1922.

Application filed January 5, 1921. Serial No. 435,173.

*To all whom it may concern:*

Be it known that I, CLARENCE W. SPICER, a citizen of the United States, residing at Plainfield, in the county of Union, State of New Jersey, have invented certain new and useful Improvements in Flexible Couplings, of which the following is a disclosure.

My invention relates to and is an improvement on flexible couplings of the general kind described in my application, Serial No. 435,172, filed Jan. 5, 1921. In constructing couplings of this kind for certain uses as, for example, for use in connecting propeller shafts for automobiles, I have found that a large number of spokes or flexible arms are desirable in order to secure the requisite flexibility combined with the necessary strength and I have conceived that this type of coupling may be improved by providing each hub with a plurality of rows of spokes arranged one row behind the other and preferably with the individual spokes of one row in staggered relation with those of the adjacent row or rows.

Figure 1:
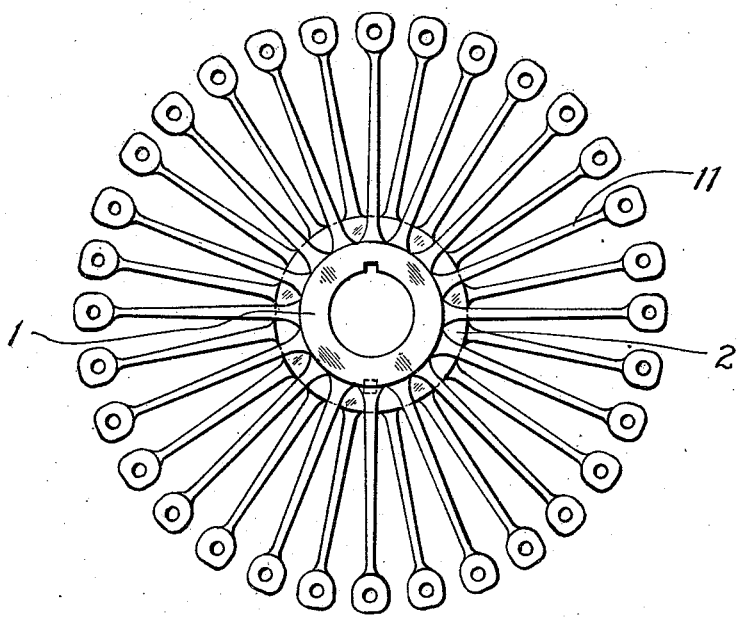
Figure 2:
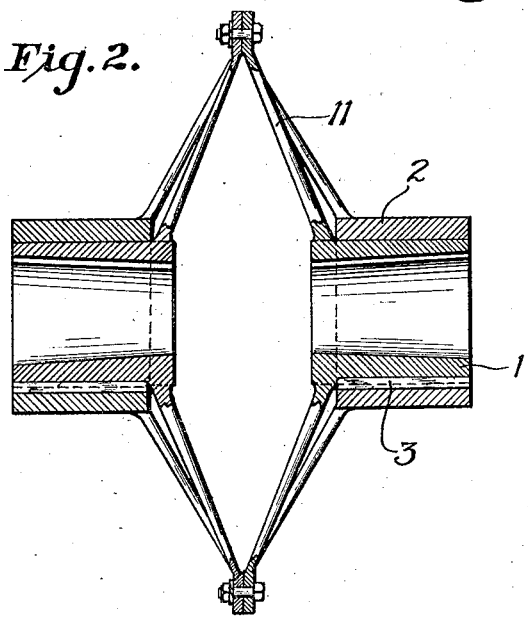
Figure 3:
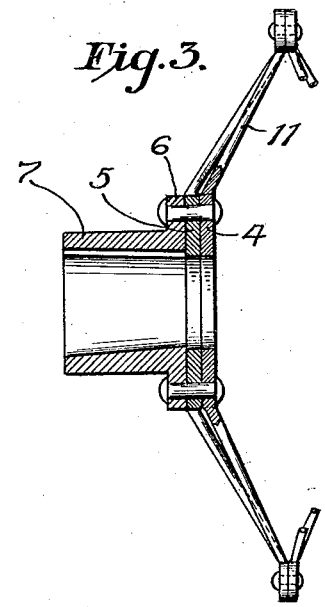

In the drawing accompanying and forming a part of this specification, I have illustrated in Figures 1 and 2 the preferred embodiment of my invention and in Figure 3 a modification. Figure 1 is a front end view of one of the hub members of my improved coupling showing the arrangement of spokes thereon. Figure 2 is a longitudinal section of the assembled coupling. Figure 3 is a detail view showing a modified method or way of securing the rows of spokes to the hub.

Referring in detail to the structure illustrated in Figures 1 and 2, each hub of the device is formed of concentric tubular members, each having a row of resilient spokes or arms mounted thereon at one end and preferably formed integral therewith. In the structure illustrated, there are two such tubular members 1 and 2 and these are secured rigidly to each other in any suitable way as by a key 3. Numerous other methods for securing these tubular members to each other may be employed as by spot-welding, brazing or shrinking one member on the other. The flexible spokes or arms 11 extend around the end of each tubular hub element with one row slightly in advance of the other at the inner ends of the spokes. By disposing the spokes of one row in staggered relation to those of the adjacent row a very large number of spokes may be mounted on a single hub without causing the spokes to rub against or interfere with the free movement of each other. With this arrangement the limiting factor in the number of spokes or flexible arms is the outside diameter where the ends of spokes are all brought into a common plane and secured together as clearly illustrated in Figure 2. Since, however, the outside or over-all diameter of the coupling may be quite large this limitation is not serious.

In Figure 3, I have shown a modified structure embodying my invention which differs from that described above only in that the several rows of spokes are formed integral with plates 4 and 5 which are bolted rigidly to the flange 6 of the hub 7. Except for this modified way of forming and mounting the spokes, the structure shown in Figure 3 is the same as that shown in Figure 2.

While I have shown only two rows of spokes, it is obvious that the number of rows may be increased and the number of spokes in the individual rows may be varied as desired.

In practicing my invention, the spokes or arms should preferably be made of spring steel and should be shaped and fashioned in the general manner described in my application above referred to.

Having now described my invention, what I claim is:

1. A flexible coupling comprising hub members, a plurality of rows of flexible arms mounted on each hub member, the arms of each row being in staggered relation with those in an adjacent row on the same hub member and the arms of one hub member bing connected to corresponding arms on the other hub member at their outer ends.

2. A flexible coupling comprising hub members, a plurality of rows of flexible arms mounted on and extending around each hub member, the arms in the several rows on each hub member being in staggered relation, and all of the arms of one member being inclined toward and connected to those of the other member.

3. A flexible coupling comprising hub members, each comprising concentric tubular elements secured to each other, flexible arms mounted on and arranged in a row adjacent the end of each tubular element, the arms of the two hubs being connected at their outer ends.

4. A flexible coupling comprising hub members, each formed of concentric tubular elements secured to each other, flexible arms formed on and arranged in a row adjacent the end of each element, the arms of each row being in staggered relation with those in an adjacent row in the same hub and the arms of the two hubs being connected at their outer ends.

5. A flexible coupling comprising hub members, each hub formed of concentric tubular elements secured to each other, flexible arms formed integral with and arranged in rows at the end of each element, the arms of each row being in staggered relation with those in an adjacent row in the same hub and the arms of the two hubs being connected at their outer ends.

6. A flexible coupling comprising in combination two hub members, each of said members having a plurality of circumferential rows of flexible arms, the inner ends of the arms of one row being in a different plane transverse to the axis of a given member than the inner ends of any other row and staggered with respect to the adjacent row, and the outer ends of the arms of one member being connected to arms in homologous rows on the other member, and all arms having the same radial extension from the axis when the axes of the two hub members are in alinement.

CLARENCE W. SPICER.